United States Patent
Berg et al.

(10) Patent No.: US 9,613,121 B2
(45) Date of Patent: Apr. 4, 2017

(54) DATA DUPLICATION DETECTION IN AN IN MEMORY DATA GRID (IMDG)

(71) Applicant: International Business Machines Corporation, Armonk, NY (US)

(72) Inventors: Douglas Berg, Rochester, MN (US); Nitin Gaur, Round Rock, TX (US); Christopher D. Johnson, Rochester, MN (US); Brian K. Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 14/202,070

(22) Filed: Mar. 10, 2014

(65) Prior Publication Data

US 2015/0254266 A1    Sep. 10, 2015

(51) Int. Cl.
*G06F 17/30* (2006.01)

(52) U.S. Cl.
CPC .. *G06F 17/30584* (2013.01); *G06F 17/30303* (2013.01); *G06F 17/30312* (2013.01)

(58) Field of Classification Search
None
See application file for complete search history.

(56) References Cited

U.S. PATENT DOCUMENTS

| 8,290,972 B1 * | 10/2012 | Deshmukh | G06F 17/30489 707/758 |
| 8,392,791 B2 | 3/2013 | Saliba et al. | |
| 8,423,726 B2 | 4/2013 | Yueh | |
| 2010/0070715 A1 | 3/2010 | Waltermann et al. | |
| 2012/0310960 A1 * | 12/2012 | Watanabe | G06F 17/30946 707/756 |
| 2015/0193439 A1 * | 7/2015 | Gaur | G06F 17/3033 707/747 |

OTHER PUBLICATIONS

Ivanov, In-Memory Database vs. In-Memory Data Grid: Revisited Jun. 9, 2014, GridGain, http://www.gridgain.com/in-memory-database-vs-in-memory-data-grid-revisited/.*
Colmer, In Memory Data Grid Technologies Dec. 21, 2011, High Scalability, http://highscalability.com/blog/2011/12/21/in-memory-data-grid-technologies.html.*

* cited by examiner

*Primary Examiner* — Jason Liao
(74) *Attorney, Agent, or Firm* — Steven M. Greenberg, Esq.; CRGO Law

(57) ABSTRACT

Embodiments of the invention provide a method, system and computer program product for data duplication detection in an in memory data grid (IMDG). A method for data duplication detection in an IMDG includes computing a hash value for each binary data value in a key value pair of a partition in an IMDG. The method also includes generating a map including an entry for each unique computed hash value and one or more keys corresponding to binary data values of respective key value pairs from which the hash value had been uniquely computed. Thereafter, only those hash values in the map with multiple keys associated therewith are identified and binary data corresponding to the multiple keys of the identified hash values are reported as potential duplicate data in the IMDG.

10 Claims, 2 Drawing Sheets

DATA DUPLICATION DETECTION IN AN IN MEMORY DATA GRID (IMDG)

BACKGROUND OF THE INVENTION

Field of the Invention

The present invention relates to in memory database grid (IMDG) utilization and more particularly to detecting duplicate data in an IMDG.

Description of the Related Art

Database query processing refers to the receipt and execution of data queries against a database. Flat file databases generally process queries in accordance with a key used to locate matching records and to return the matching records to the requestor. To the extent that data is to be culled from different related records, a series of queries are required to located different keys in different database tables so as to ultimately return the desired set of data. Relational databases improve upon flat file databases by permitting the logical joining together of different tables so as to execute a single query against the joined set of tables in order to produce a desired set of data.

An in memory data grid (IMDG) is a highly distributable form of a database that permits parallel processing across a set of disparately located computing devices. The use of an IMDG permits substantial parallelization of database operations and, in consequence, efficient utilization of unused processing resources in each host computing device supporting the IMDG. To the extent that data in the IMDG is highly distributed, relational database concepts cannot be effectively applied. Thus, though highly scalable, database operations in an IMDG are substantially granular and numerous in comparison to that of a traditional relational database.

Abstractly, an IMDG is a distributed object store similar in interface to a typical concurrent hash map. In an IMDG objects are stored with keys and an interface is provided as a simple hash map. In this regard, the fundamental IMDG paradigm is a key-value pair, wherein the grid of the IMDG stores values with an associated key, by which the value is subsequently retrieved. The map itself includes entries of such key-value pairs. Therefore, the map provides a picture of the content of the different nodes of the IMDG.

Given the nature of an IMDG, oftentimes data can be stored in duplicate in different portions of the IMDG. This duplication of data can arise intentionally in consequence of data map duplication. Alternatively, this duplication can arise unintentionally in error. In either case, data duplication in an IMDG can have some adverse consequence. First, memory can be unnecessarily consumed to accommodate duplicate instances of data. Second, data consistency can become compromised where one instance of duplicate data updates and a duplicate instance of the same data does not update. As such, an inefficiency in the IMDG itself can result.

BRIEF SUMMARY OF THE INVENTION

Embodiments of the present invention address deficiencies of the art in respect to IMDG management and provide a novel and non-obvious method, system and computer program product for data duplication detection in an IMDG. In an embodiment of the invention, a method for data duplication detection in an IMDG is provided. The method includes computing by a processor of a computer a hash value for each binary data value in a key value pair of a partition in an IMDG. The method also includes generating a map in memory of the computer the map including an entry for each unique computed hash value and one or more keys corresponding to binary data values of respective key value pairs from which the hash value had been uniquely computed. Thereafter, only those hash values in the map with multiple keys associated therewith are identified and binary data corresponding to the multiple keys of the identified hash values are reported as potential duplicate data in the IMDG. In one aspect of the embodiment, the method also includes removing the multiple keys of the identified hash value from the partition of the IMDG.

Of note, the computing and generating can be performed by an agent in the partition of the IMDG and wherein the identifying and reporting is performed by a client of an interface to the IMDG. Alternatively, the computing and generating can be performed separately and independently by different agents in respectively different partitions of the IMDG and wherein the identifying and reporting is performed by a client of an interface to the IMDG. As yet a further alternative, the computing and generating is performed separately and independently by different agents in respectively different partitions of different IMDGs and wherein the identifying and reporting is performed by a coordinating client of the different IMDGs.

In another embodiment of the invention, a data processing system can be configured for data duplication detection in an IMDG. The system can include a host computing system that includes one or more computers each with memory and at least one processor. The system also can include at least one server communicatively coupled to the host computing system over a computer communications network and hosting in memory an IMDG. The system yet further can include an IMDG interface executing in the memory of the host computing system and providing access to the IMDG. Finally, the system can include a data duplication detection module executing in the memory of the host computing system.

The module can include program code enabled upon execution to compute a hash value for each binary data value in a key value pair of a partition in the IMDG, to generate a map including an entry for each unique computed hash value and one or more keys corresponding to binary data values of respective key value pairs from which the hash value had been uniquely computed, to identify only those hash values in the map with multiple keys associated therewith, and to report binary data corresponding to the multiple keys of the identified hash values as potential duplicate data in the IMDG.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being

DETAILED DESCRIPTION OF THE INVENTION

Embodiments of the invention provide for data duplication detection in an IMDG. In accordance with an embodiment of the invention, the data content of a partition of a node in an IMDG can be processed to compute hash values for the binary data contained therein. A map can be populated with a listing of each of the computed hash values and corresponding keys for the binary data sharing the same computed hash value. Thereafter, hash values in the map having multiple keys are recognized as being the source of potential duplicates in the IMDG. As a further processing step, the binary data corresponding to the keys of the hash values in the map having multiple keys can be compared to confirm the presence of duplicate data, and duplicate ones of the multiple keys can be discarded in the partition of the IMDG so as to eliminate the duplicate data. Of note, the process can be performed across multiple partitions of the IMDG so that a separate map is produced for each partition. Of additional note, the process can be performed across multiple partitions by multiple IMDGs such that a coordinating client of the IMDGs can identified duplicate data disposed therebetween.

Figure 1:
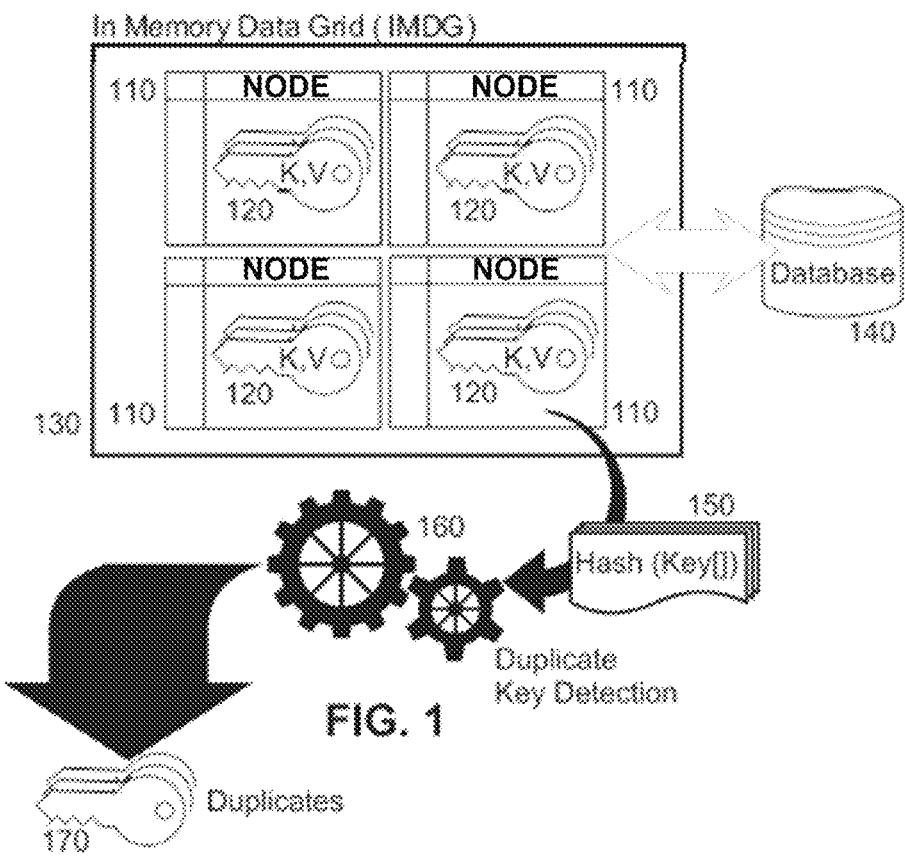
FIG. 1 is a pictorial illustration of a process for data duplication detection in an IMDG.

In further illustration, FIG. 1 pictorially shows a process for data duplication detection in an IMDG. As shown in FIG. 1, an IMDG 130 can include different nodes 110 each storing key value pairs 120 corresponding to data stored therein. Optionally, the data of the different nodes 110 can be persisted in fixed storage 140 and retrieved into the IMDG 130 at runtime. Duplicate key detection logic 160 can analyze a collection of different hashes 150 of the values of the key value pairs 120. Different ones of the keys of the key value pairs 120 corresponding to data of the key value pairs 120 sharing a same one of the hashes 150 can be stored in association with the same one of the hashes 150.

Subsequently, the duplicate key detection logic can identify those of the hashes 150 having multiple keys of the key value pairs 120 associated therewith. In response to identifying the hashes 150 having multiple associated ones of the keys of the key value pairs 120, the underlying values of the key value pairs 120 for the associated ones of the associated keys can be compared to truly identify duplicate data so as to indicate duplicate keys 170. As such, the duplicate keys 170 having been identified, the duplicate keys 170 can be removed from the different nodes 110. In this way, data duplication can be detected and remediated.

Figure 2:
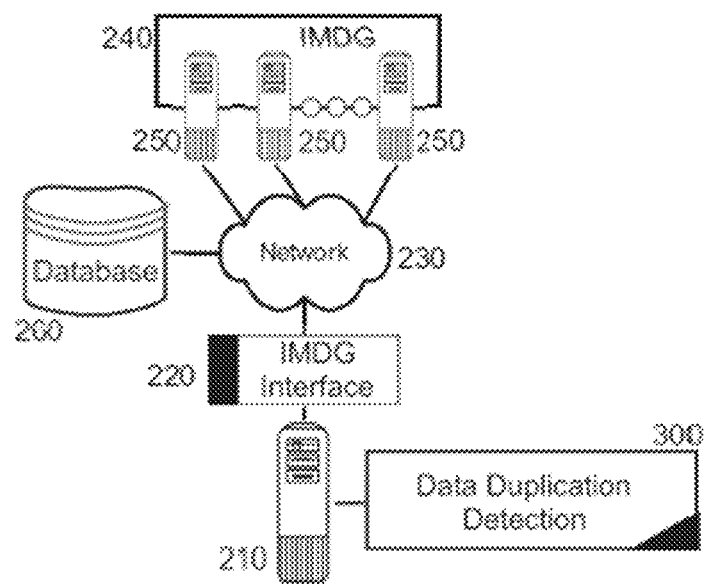
FIG. 2 is a schematic illustration of a data processing system configured for data duplication detection in an IMDG; and, FIG. 3 is a flow chart illustrating a process for data duplication detection in an IMDG.

The process described in connection with FIG. 1 can be implemented in a data processing system configured for data duplication detection in an IMDG. In yet further illustration, FIG. 2 schematically shows a data processing system configured for data duplication detection in an IMDG. The system can include a host computing system 210 the can include one or more computers each with memory and at least one processor. The host computing system 210 can support an interface 220 over a computer communications network 230 to an IMDG 240 supported by different servers 250. Optionally, a database 260 can be coupled to the IMDG 240 to support persistence of data in the IMDG 240.

Of note, a data duplication detection module 300 can execute in the memory of the host computing system 210. The data duplication module 300 can include program code that when executed by one or more processors of the host computing system 210 is enabled to generate a hash value for each of the data of the IMDG 240 and to store in a map each uniquely generated hash value and one or more keys corresponding to the data from which the has value had been generated. The program code of the data duplication module 300 also can be enabled to identify each uniquely generated hash value in association with which multiple keys are stored in the map. For each hash value for which multiple keys are associated, the data corresponding to the multiple keys can be compared so as to confirm duplicate instances of the data. As such, the program code of the data duplication module 300 can remove from the IMDG 240 those of the multiple keys corresponding to the duplicate instances of the data.

Figure 3:
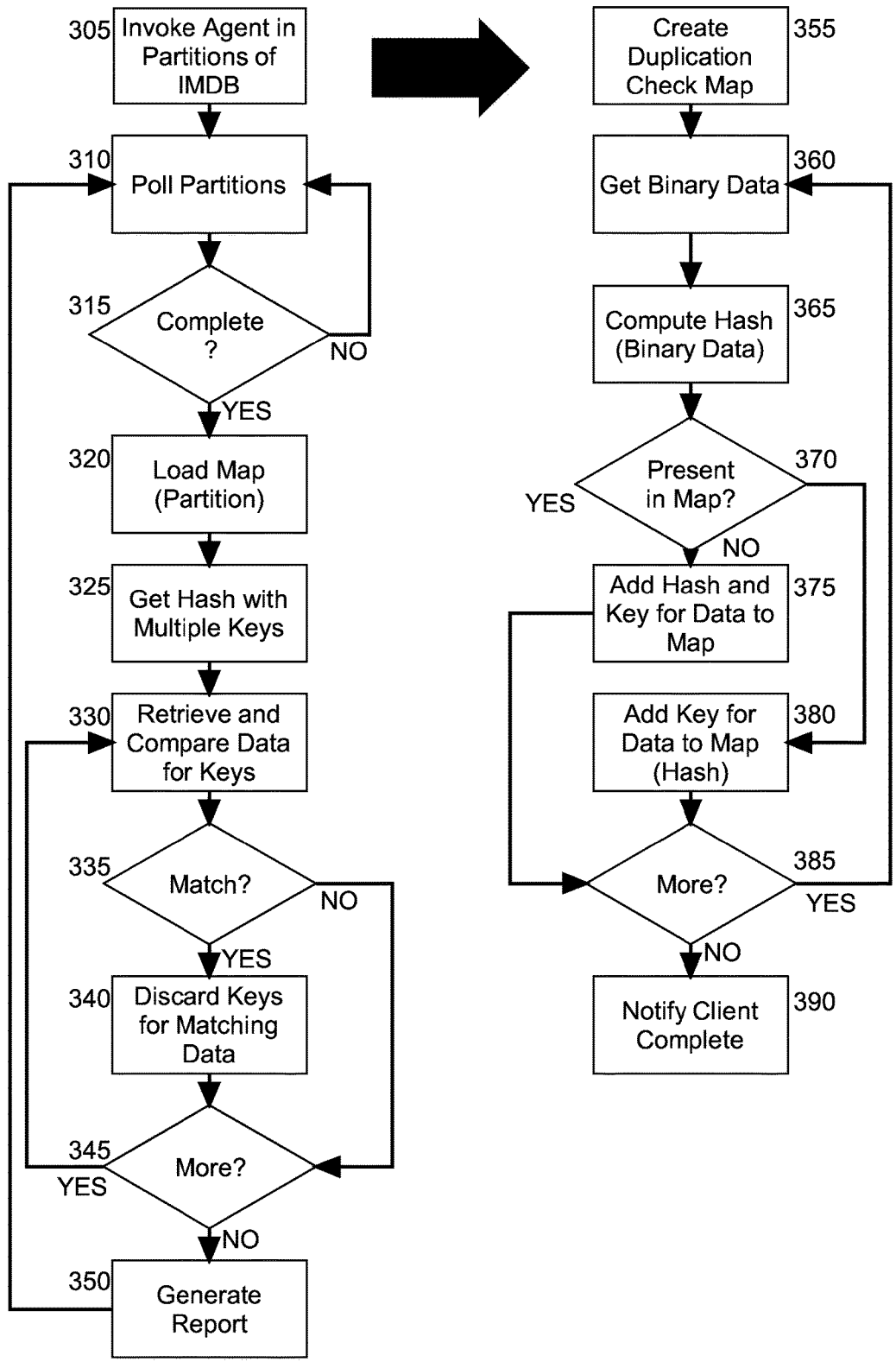

In even yet more particular illustration of the operation of the data duplication module 300, FIG. 3 is a flow chart illustrating a process for data duplication detection in an IMDG. Beginning in block 305, a client associated with the IMDG interface to the IMDG can invoke an agent in each partition of the IMDG. Referring to block 355, the agent in response to the client can create a duplication check map into which different hash values of data can be stored in association with one or more keys for the data. In block 360, binary data can be loaded into memory from which a hash value can be computed in block 365.

In decision block 370 it can be determined if the computed hash value is already present as an existing hash value in the map. If not, in block 380 the computed hash value can be added to the map and the key for the binary data also can be added to the map in association with the computed hash value. Otherwise, in block 375 the key for the binary data can be added to the map in association with the existing hash value. In decision block 385, if additional binary data remains to be processed, the method can return to block 360 with the retrieval of additional binary data from the partition. When no further binary data remains to be processed, in block 390 the agent can notify the client that the duplication check map has been completed.

In block 310, once the client has invoked the agent in each of the partitions of the IMDG, the agents can be polled to determine in decision block 315 when a duplication check map has been completed for a corresponding partition. In decision block 315, when it is determined that a duplication check map has been completed in a corresponding partition, in block 320 the duplication check map can be loaded into memory for processing. In block 325, a first hash entry in the map can be retrieved that has associated therewith multiple keys (hash entries with only a single associated key can be bypassed). In block 330, the binary data for each key associated with the retrieved hash can be compared to one another to identify duplicate binary data. In decision block 335, if binary data match, in block 340 corresponding keys can be discarded from the partition. Subsequently, in decision block 345 it can be determined if additional hash entries remain to be processed. If not, in block 350 a report can be generated indicating the identified and discarded keys.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A data processing system configured for data duplication detection in an in memory data grid (IMDG), the system comprising:
   a host computing system comprising one or more computers each with memory and at least one processor;
   at least one server communicatively coupled to the host computing system over a computer communications network, the at least one server hosting in memory an IMDG;
   an IMDG interface executing in the memory of the host computing system and providing access to the IMDG; and,
   a data duplication detection module executing in the memory of the host computing system, the module comprising program code enabled upon execution to compute a hash value for each binary data value in a key value pair of a partition in the IMDG, to generate a map including an entry for each unique computed hash value and one or more keys corresponding to binary data values of respective key value pairs from which the hash value had been uniquely computed, to identify only those hash values in the map with multiple keys associated therewith, and to report binary data corresponding to the multiple keys of the identified hash values as potential duplicate data in the IMDG.

2. The system of claim 1, wherein the program code of the module is further enabled to remove the multiple keys of the identified hash value from the partition of the IMDG.

3. The system of claim 1, further comprising an agent in the partition of the IMDG, wherein the computing and generating is performed by the agent wherein the identifying and reporting is performed by a client of the interface to the IMDG.

4. The system of claim 1, further comprising multiple different agents, each disposed in a correspondingly different partition of the IMDG wherein the computing and generating is performed separately and independently by the different agents in the respectively different partitions of the IMDG and wherein the identifying and reporting is performed by a client of the interface to the IMDG.

5. The system of claim 1, further comprising multiple different agents, each disposed in a correspondingly different partition of different IMDGs hosted by the at least one server, wherein the computing and generating is performed separately and independently by the different agents in the respectively different partitions of the different IMDGs and wherein the identifying and reporting is performed by a coordinating client of the different IMDGs.

6. A computer program product for data duplication detection in an in memory data grid (IMDG), the computer program product comprising a computer readable storage medium having program instructions embodied therewith, the program instructions executable by a device to cause the device to perform a method comprising:
   computing a hash value for each binary data value in a key value pair of a partition in an IMDG;
   generating a map including an entry for each unique computed hash value and one or more keys corresponding to binary data values of respective key value pairs from which the hash value had been uniquely computed;
   identifying only those hash values in the map with multiple keys associated therewith; and,
   reporting binary data corresponding to the multiple keys of the identified hash values as potential duplicate data in the IMDG.

7. The computer program product of claim 6, further comprising removing the multiple keys of the identified hash value from the partition of the IMDG.

8. The computer program product of claim 6, wherein the computing and generating is performed by an agent in the partition of the IMDG and wherein the identifying and reporting is performed by a client of an interface to the IMDG.

9. The computer program product of claim 6, wherein the computing and generating is performed separately and independently by different agents in respectively different partitions of the IMDG and wherein the identifying and reporting is performed by a client of an interface to the IMDG.

10. The computer program product of claim 6, wherein the computing and generating is performed separately and independently by different agents in respectively different partitions of different IMDGs and wherein the identifying and reporting is performed by a coordinating client of the different IMDGs.

* * * * *